US009143345B2

(12) United States Patent
Maeng et al.

(10) Patent No.: US 9,143,345 B2
(45) Date of Patent: Sep. 22, 2015

(54) SYSTEM AND METHOD FOR PROVIDING PHONE RELATED SERVICES TO DEVICES USING UPNP ON A HOME NETWORK

(75) Inventors: Je-Young Maeng, Suwon-si (KR); Dong-Shin Jung, Suwon-si (KR); Joo-Yeol Lee, Seongnam-si (KR); Se-Hee Han, Seoul (KR); Mahfuxur Rahman, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 266 days.

(21) Appl. No.: 12/776,766

(22) Filed: May 10, 2010

(65) Prior Publication Data
US 2010/0284398 A1  Nov. 11, 2010

(30) Foreign Application Priority Data

May 8, 2009  (KR) .................. 10-2009-0040420
Jun. 23, 2009  (KR) .................. 10-2009-0055919
Oct. 9, 2009  (KR) .................. 10-2009-0096471
Mar. 12, 2010  (KR) .................. 10-2010-0022114

(51) Int. Cl.
*H04L 12/26* (2006.01)
*H04L 12/28* (2006.01)
*H04M 3/42* (2006.01)
*H04L 29/06* (2006.01)

(52) U.S. Cl.
CPC ........ *H04L 12/2838* (2013.01); *H04L 65/1026* (2013.01); *H04L 65/1069* (2013.01); *H04M 3/42238* (2013.01); *H04L 2012/2849* (2013.01)

(58) Field of Classification Search
CPC .................. H04L 12/2838; H04L 2012/2849; H04L 65/1026; H04L 65/1069; H04M 3/42238

USPC .................. 370/229, 230, 241, 252; 709/220
See application file for complete search history.

(56) References Cited

U.S. PATENT DOCUMENTS

| 6,725,281 | B1 * | 4/2004 | Zintel et al. ................ 719/318 |
| 6,785,375 | B1 * | 8/2004 | Beddus et al. ........... 379/220.01 |
| 7,088,687 | B2 * | 8/2006 | Ayyagari et al. ............. 370/278 |
| 7,257,641 | B1 * | 8/2007 | VanBuskirk et al. ......... 709/238 |
| 7,343,157 | B1 * | 3/2008 | Mitchell ....................... 455/431 |
| 7,653,046 | B2 * | 1/2010 | Benco et al. .................. 370/352 |
| 7,675,922 | B2 * | 3/2010 | Magendanz et al. .......... 370/401 |
| 7,698,365 | B2 * | 4/2010 | Van Buskirk et al. ........ 709/204 |
| 7,818,784 | B2 * | 10/2010 | Kunito et al. ..................... 726/2 |
| 8,095,596 | B2 * | 1/2012 | Meenan et al. ............... 709/205 |

(Continued)

FOREIGN PATENT DOCUMENTS

CN  1604576  4/2005
CN  1620070  5/2005

(Continued)

*Primary Examiner* — Chi H Pham
*Assistant Examiner* — Robert Lopata
(74) *Attorney, Agent, or Firm* — The Farrell Law Firm, P.C.

(57) ABSTRACT

A system and method for exchanging call data between multiple devices using Universal Plug and Play (UPnP) on a home network. The system includes a telephony terminal, a first electronic device, a second electronic device, and a control point for selecting the telephony terminal and the first and second electronic devices for exchanging the call data, for setting a call reception connection between the telephony terminal and the first and second electronic devices, and forming a plurality of sessions for exchanging the call data between the selected telephony terminal and the first and second electronic devices.

43 Claims, 11 Drawing Sheets

(56) References Cited

U.S. PATENT DOCUMENTS

| | | | |
|---|---|---|---|
| 8,477,761 B2* | 7/2013 | Prasad et al. | 370/352 |
| 8,576,271 B2* | 11/2013 | Moore et al. | 348/14.08 |
| 2003/0142798 A1 | 7/2003 | Gavette et al. | |
| 2004/0184096 A1 | 9/2004 | Choi | |
| 2005/0076150 A1 | 4/2005 | Lee et al. | |
| 2006/0112417 A1 | 5/2006 | Son et al. | |
| 2006/0133345 A1 | 6/2006 | Benco et al. | |
| 2006/0153072 A1* | 7/2006 | Bushmitch et al. | 370/230 |
| 2006/0199621 A1 | 9/2006 | Stirbu et al. | |
| 2007/0043941 A1 | 2/2007 | Kunito et al. | |
| 2007/0058559 A1* | 3/2007 | Xu | 370/252 |
| 2007/0136778 A1* | 6/2007 | Birger et al. | 725/117 |
| 2007/0143489 A1 | 6/2007 | Pantalone | |
| 2007/0198669 A1* | 8/2007 | Convertino et al. | 709/220 |
| 2007/0200920 A1* | 8/2007 | Walker et al. | 348/14.08 |
| 2007/0226311 A1 | 9/2007 | Kaarela et al. | |
| 2008/0100694 A1* | 5/2008 | Barkley et al. | 348/14.08 |
| 2009/0193469 A1 | 7/2009 | Igarashi | |
| 2009/0238108 A1 | 9/2009 | Nakae et al. | |
| 2010/0040211 A1* | 2/2010 | Maeng et al. | 379/93.15 |
| 2010/0153574 A1* | 6/2010 | Lee et al. | 709/231 |
| 2010/0157989 A1* | 6/2010 | Krzyzanowski et al. | 370/352 |
| 2010/0157990 A1* | 6/2010 | Krzyzanowski et al. | 370/352 |
| 2010/0208746 A1* | 8/2010 | Rahman | 370/464 |
| 2011/0054644 A1 | 3/2011 | Baek et al. | |
| 2011/0085648 A1 | 4/2011 | Maeng et al. | |
| 2011/0116419 A1* | 5/2011 | Cholas et al. | 370/259 |

FOREIGN PATENT DOCUMENTS

| | | |
|---|---|---|
| CN | 1780234 | 5/2006 |
| CN | 1820457 | 8/2006 |
| CN | 1917709 | 2/2007 |
| CN | 101167339 | 4/2008 |
| CN | 101395588 | 3/2009 |
| JP | 2006-115377 | 4/2006 |
| JP | 2006-260425 | 9/2006 |
| JP | 2007-053641 | 3/2007 |
| JP | 2007-110186 | 4/2007 |
| JP | 2007-325004 | 12/2007 |
| KR | 1020050119018 | 12/2005 |
| KR | 1020100021386 | 2/2010 |
| WO | WO 2006/095787 | 9/2006 |

* cited by examiner

SYSTEM AND METHOD FOR PROVIDING PHONE RELATED SERVICES TO DEVICES USING UPNP ON A HOME NETWORK

PRIORITY

This application claims priority under 35 U.S.C. §119(a) to applications filed in the Korean Industrial Property Office on May 8, 2009, Jun. 23, 2009, Oct. 9, 2009, and Mar. 12, 2010, which were assigned Serial Nos. 10-2009-0040420, 10-2009-0055919, 10-2009-0096471, and 10-2010-0022114, respectively, the content of each of which is hereby incorporated by reference.

BACKGROUND OF THE INVENTION

1. Field of the Invention

The present invention relates generally to home network technology, and more particularly, to a system and method for providing phone related services to devices using Universal Plug and Play (UPnP) on a home network.

2. Description of the Related Art

In general, a home network includes an Internet Protocol (IP) based private network, which connects diverse devices, such as all types of Personal Computers (PC), intelligent products, wireless devices, etc., which are used in a home, to one network through a common virtual computing environment that control the devices, often referred to as "middleware".

Middleware enables communication between diverse digital devices by connecting the devices in a peer-to-peer manner. Specific examples of middleware currently include Home Audio Video (AV) Interoperability (HAVI), UPnP, Java Intelligent Network Infra-structure (Jini), and Home Wide Web (HWW).

In a computing environment constructed through the UPnP middleware, i.e., a UPnP network, the respective devices included therein may be allocated with addresses from a server in accordance with a Dynamic Host Configuration Protocol (DHCP) or addresses selected by an Automatic IP designation function (Auto IP).

The UPnP network is a home network technology that is frequently used, and defines a UPnP device, a UPnP service, and a protocol between them. The UPnP network includes a Controlled Device (CD), which is a home network device that is connected to an IP based home network to be controlled, and a Control Point (CP) that is a device for controlling the CD. The CP is a device that controls the CD, and is a constituent element that requests and receives an event. The CD is a device that performs a determined function in accordance with a request of the CP, and is a constituent element that sends the event to the CP that has requested the event when the state of the CD is changed.

A basic operation process between devices of a conventional UPnP network includes an advertisement process, a discovery process, a description process, a control process, and an eventing process.

In the advertisement process, a new CD is connected to a home network and informs other devices on the home network of the new CD. In the discovery process, a new CP is connected to the home network and searches controlled devices, which operate on the home network.

In the description process, the CP, in order to control the CDs, obtains detailed function information for a newly added device by parsing service description eXtensible Markup Language (XML) file or a device description XML file through an IP address of the CD that is obtained in the discovery process.

In the control process, when the CP intends to provide a specified service through the CD, the CP transfers, i.e., transmits, a control message (i.e., action request) for requesting the specified message to the corresponding CD using a Simple Object Access Protocol (SOAP), in accordance with a UPnP device architecture. In response to the request, the CP receives a response message (i.e., result, variable value) from the CD.

The eventing process confirms an information change state of the CD, which has provided the specified service, using a control command that is transferred from the CP. In UPnP telephony technology, which can transfer received call data to a home device and enable a user to make a call using the home device and the above-described UPnP technology, the UPnP telephony architecture includes a telephony terminal that receives a phone call from the outside, a home electronic device that is transferred with phone data, and a CP that controls the two devices.

The CP can control the functions of the telephony terminal and the electronic device using the network, and controls a connection between two devices and media session establishment.

However, the current telephony technology assumes a single user, and has been designed so that when a single user uses multiple electronic devices, the respective electronic devices transfer/receive only a single media type such as audio, video, etc.

Accordingly, there currently is no support for telephony technology when multiple users simultaneously transfer the same plural media using different electronic devices.

Conventionally, a call can be made using a home device, and when multiple electronic devices are provided at the home, a user can make a call using the multiple devices. However, although a channel for transferring media is formed between a telephony terminal and an electronic device to transfer audio and video, there is a problem that audio and video cannot be transferred among the multiple electronic devices.

For example, when a first user and a second user connect portable phones using multiple electronic devices, such as a TV at the home, and make phone calls with a third user through the portable phones, the first user and the second user can make phone calls with the third user, respectively, but it is impossible to make a phone call between the first user and the second user, and thus there is a problem that neither the first nor second user can hear or see the other party.

SUMMARY OF THE INVENTION

Accordingly, the present invention has been made to solve at least the above-mentioned problems occurring in the prior art, and the present invention provides a system and method for providing phone related services to devices using UPnP on a home network.

In accordance with an aspect of the present invention, there is provided a system for exchanging call data between multiple devices using Universal Plug and Play (UPnP) on a home network. The system includes a telephony terminal, a first electronic device, a second electronic device, and a control point for selecting the telephony terminal and the first and second electronic devices for exchanging the call data, for setting a call reception connection between the telephony terminal and the first and second electronic devices, and forming a plurality of sessions for exchanging the call data between the selected telephony terminal and the first and second electronic devices.

In accordance with another aspect of the present invention, there is provided a method for exchanging call data between a plurality of devices using Universal Plug and Play (UPnP) on a home network that includes a telephony terminal, a first electronic device, a second electronic device, and a control point. The method includes selecting, by the control point, the telephony terminal and the first and second electronic devices; setting, by the control point, a call reception connection between the selected telephony terminal and the first and second electronic devices; forming, by the control point, a plurality of sessions for exchanging the call data including audio and video signals between the telephony terminal and the first and second electronic devices; and exchanging the call data between the telephony terminal and the first and second electronic devices using the plurality of sessions.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described in detail with reference to the accompanying drawings. In the following description, a detailed description of known functions and configurations incorporated herein will be omitted when it may obscure the subject matter of the present invention.

The present invention follows an architecture and processes for transferring a signal call proposed in the related art, and a part that is additionally required to transfer calls will be described.

Figure 1:
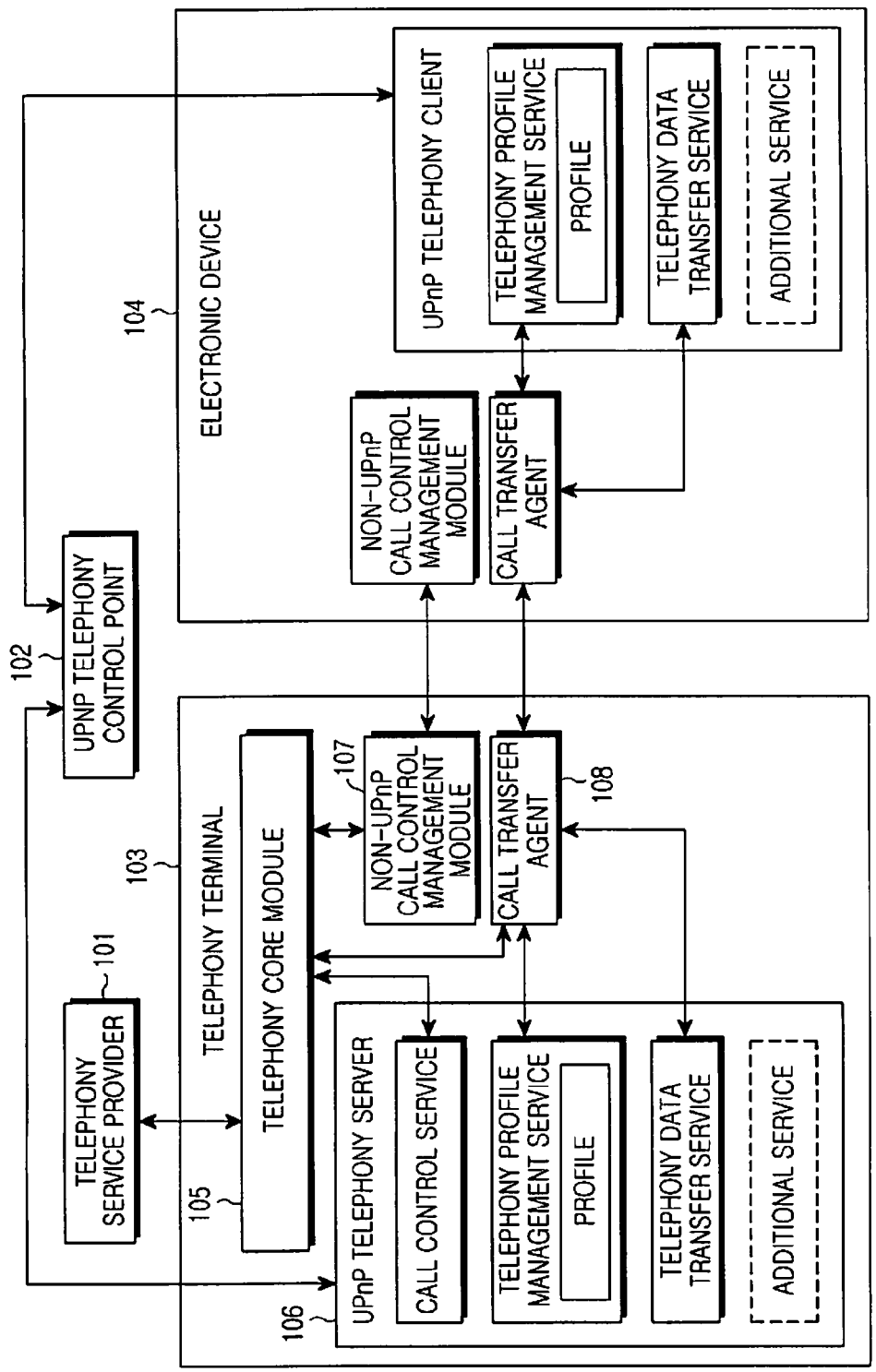
FIG. 1 illustrates a conventional call transfer/reception system.

FIG. 1 illustrates a conventional call transfer/reception system.

Referring to FIG. 1, the conventional call transfer/reception system includes a telephony service provider 101, a UPnP telephony CP 102, a telephony terminal 103, and an electronic device 104.

The telephony terminal 103 includes a UPnP telephony server 106, a telephony core module 105, a non-UPnP call control management module 107, and a call transfer agent 108.

The telephony core module 105 generally performs a function for accessing a cellular network, and provides a response to a user call transfer or call reception request and call data transfer. The telephony core module 105 uses diverse services provided by the telephony service provider 101. The UPnP telephony CP 102 controls the UPnP telephony server 106, and the UPnP telephony server 106 controls the telephony core module 105 using an inner interface.

Additionally, the non-UPnP call control management module 107 provides a method of controlling the telephony core module 105 using a non-UPnP protocol.

The call transfer agent 108 changes transferred call data to a data format or a form of a codec, etc, which can be used by the telephony core module 105, and transfers the changed data to the electronic device 104.

Here, the transfer of user voice and video signals is controlled by the UPnP telephony control point 102, and a start and end of data streaming are controlled by a call control signal called by the UPnP telephony CP 102 or an inherent user interface provided by the telephony terminal 103.

Figure 2:
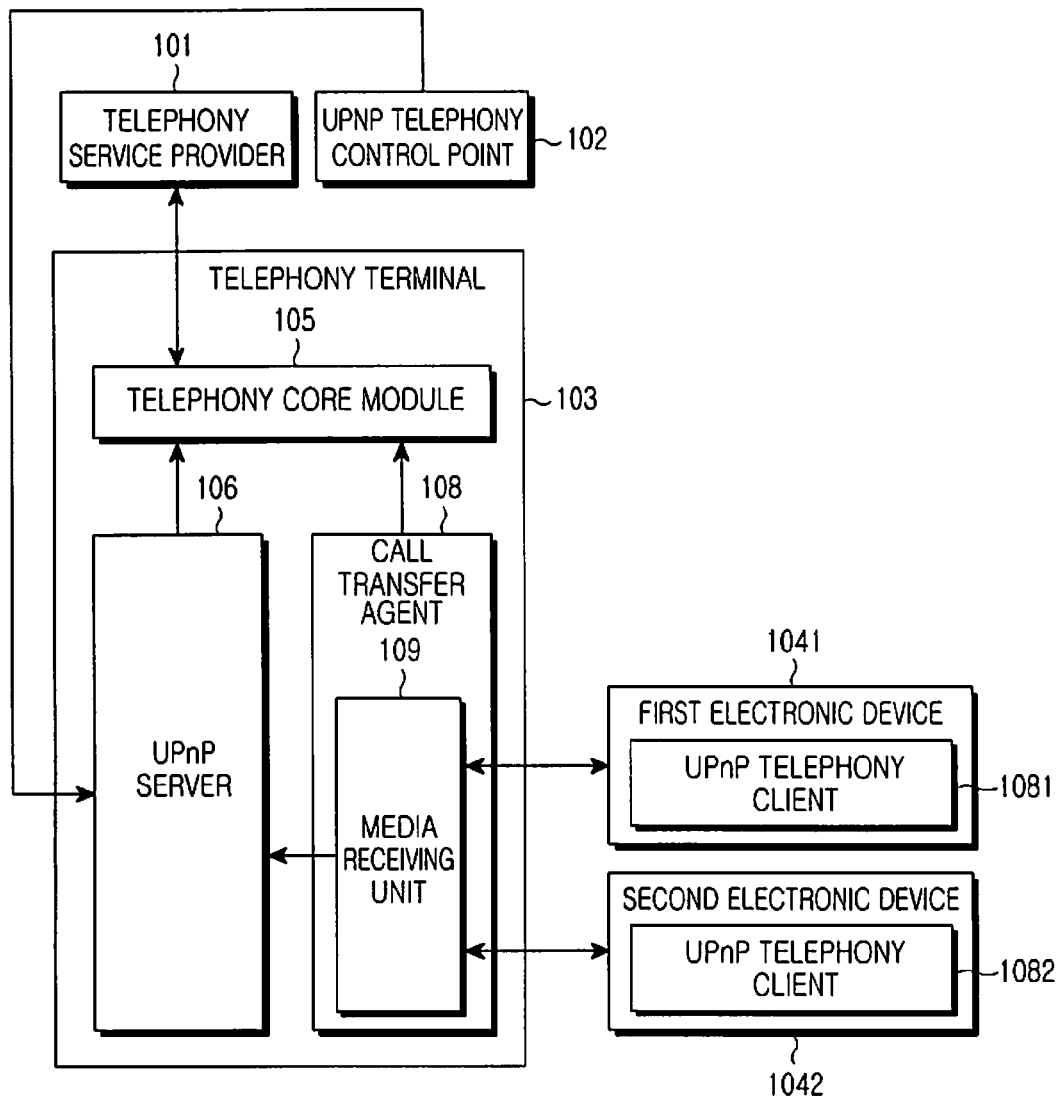
FIG. 2 illustrates a system for providing a phone related service according to an embodiment of the present invention.

FIG. 2 illustrates a system for providing a phone related service according to an embodiment of the present invention. Specifically, the system illustrates in FIG. 2, enables multiple calls between electronic devices that are connected to one telephony terminal.

More specifically, multiple calls between multiple users means that the telephony service provider 101 and the telephony core module 105 are connected in a 1:1 relationship, and the telephony service provider 101 and multiple electronic devices having diverse built-in UPnP telephony clients are connected in a 1:N relationship. That is, for the service provider, it appears that communication is made with one terminal in the same manner as described above in the related art.

Also, in accordance with an embodiment of the present invention, the same telephony terminal may create multiple calls in accordance with the function provided from the telephony core module 105.

For example, in a $3^{rd}$ Generation (3G) smart phone having a wireless Local Area Network (LAN) interface, a call may be made using a 3G network or Voice over Internet Protocol (VoIP) or may be made using a wireless LAN. In this case, a number of distinctive telephony core modules 105 may exist in the same telephony terminal, and a UPnP telephony server 106, which form pairs with the plural telephony core modules 105, may also exist, so that it appears as if separate UPnP telephony servers 106 exist.

A telephony core module 105 simultaneously controls 3G and VoIP. In this case, the single UPnP telephony server 106 provides a connection IDentifier (ID) for identifying an external connection of the telephony core module 105. Multiple UPnP telephony clients can form sessions capable of simultaneously performing independent calls using the IDs.

Referring to FIG. 2, in accordance with an embodiment of the present invention, the system for providing phone related services includes a telephony service provider 101, a UPnP telephony CP 102, a telephony terminal 103, a first electronic device 1041 and a second electronic device 1042, i.e., multiple electronic devices.

The UPnP telephony CP 102 is a module that controls a UPnP telephony server and a UPnP telephony client using a UPnP action. The UPnP telephony CP 102 may be physically included in an independent device, such as a telephony terminal 103, an electronic device 1041 or 1042, a Personal Computer (PC), a Personal Digital Assistant (PDA), etc. If the UPnP telephony CP 102 is included in the telephony terminal 103 or the electronic device 1041 or 1042, it is not necessary to use the UPnP action, but an internal method may be used in order to control the UPnP telephony server 106 and the UPnP telephony client.

The first electronic device 1041 and the second electronic device 1042 connect to the one telephony terminal 103, and send and receive audio and video signals with the connected telephony terminal 103 and also other electronic devices. That is, a user of the electronic device can simultaneously perform call communication with an opposite party that has transferred a call and users of other electronic devices.

The first electronic device 1041 and the second electronic device 1042 include devices such as TeleVisions (TVs), electronic devices capable of inputting/outputting user voice and image, and a PC. Herein, The first electronic device 1041 and the second electronic device 1042 describe physical devices including UPnP telephony clients 1081 and 1082, respectively.

As described above, multiple electronic devices may exist in a home, and a user can use these electronic devices and simultaneously respond to a call made through a portable phone. That is, a telephony terminal 103 according to an embodiment of the present invention can receive the same call simultaneously through the telephony terminal 103 itself, and the first and second electronic devices 1041 and 1042, e.g., a TV in a living room and a TV in a dining room, which include UPnP telephony clients 1081 and 1082 therein, respectively.

Additionally, the first and second electronic devices 1041 and 1042 including the UPnP telephony clients 1081 and 1082, respectively, are not limited to devices at the home. That is, the present invention is also applicable to devices outside the home, wherein a multi-party call communication can be performed by the UPnP telephony function of the devices themselves without any service provided by the telephony service provider 101, using wireless Personal Area Network (PAN) technology such as Wi-Fi®, Bluetooth®, etc.

In order to work as a physical device such as a portable phone, an electronic device such as a phone for home use, and a PC including VoIP configured by software, the telephony terminal 103 includes a telephony core module 105, a UPnP telephony server 106 configured by software, and a call transfer agent 108. Also, the telephony terminal 103 may transfer/receive or control a call using an interface provided by the telephony service provider 101.

In accordance with an embodiment of the present invention, the telephony core module 105 and the UPnP telephony server 106 operate in a similar manner to the telephony core module 105 and the UPnP telephony server 106 as described above with reference to FIG. 1, and thus, a repetitive description thereof will be omitted below.

In FIG. 2, the media receiving unit 109 receives audio and video signals from multiple electronic devices including the first electronic device 1041 and the second electronic device 1042, integrate and change the received audio and video signals to a form that is suitable for the telephony service provider 101. The call transfer agent 108 illustrated in FIG. 2 performs functions that are performed by the conventional call transfer agent 108 illustrated in FIG. 1, and additionally performs functions for media transfer between electronic devices.

In FIG. 2, although the media receiving unit 109 is illustrated as a component of the call transfer agent 108, the media receiving unit 109 may also be configured as an independent module, outside of the call transfer agent 108.

Additionally, the call transfer agent 108 may be configured independently inside the telephony terminal 103, as illustrated in FIG. 2, or may be configured to be integrated into the function of the UPnP telephony server 106 or the telephony terminal 103.

The media receiving unit 109 processes media data received from the UPnP telephony clients 1081 and 1082, and audio and video signals input through the telephony terminal 103. For example, when a portable phone operates as the telephony terminal 103, a user can perform call communication using a camera and a microphone of the portable phone, and simultaneously perform call communication using an electronic device such as a TV. In this case, the media receiving unit 109 integrates the audio and video signals input by the user using the camera and the microphone and the audio and video signals received from the electronic device, and transfers the integrated signals to the telephony core module 105.

Table 1 below shows an example for describing a kind of media and codec provided from the telephony terminal 103 and an electronic device. Using this method, the telephony terminal 103 and the electronic device inform the UPnP telephony CP 102 of their media capability, and the UPnP telephony CP 102 analyzes the received media capabilities and selects the media capability to be used for media streaming.

TABLE 1

```
<?xml version="1.0" encoding="UTF-8"?>
<MediacapabilityInfo>
    <mediacapability mediaformat="SDP">
        v=0
        o=– 0 0 IN IP4 10.35.195.2
        s=–
        c=IN IP4 10.35.195.2
        t=0 0
        m=audio 5004 RTP/AVP 0
        a=rtpmap:0 PCMU/8000
        m=video 5006 RTP/AVP 96
        b=AS:48
        a=rtpmap:96 MP4V-ES/90000
        a=fmtp:96 profile-level-id=8
        m=application 9 TCP soap+xml
        a=setup:active
        a=connection:new
    </mediacapability>
</MediaCapabilityInfo>
```

In order to describe the media capability in Table 1, a Session Description Protocol (SDP) data format has been adopted, and when several supportable media types or codecs exist, they are described using different parameters (e.g., m parameters). This method may be used in the current UPnP Telephony standard.

Figure 3:
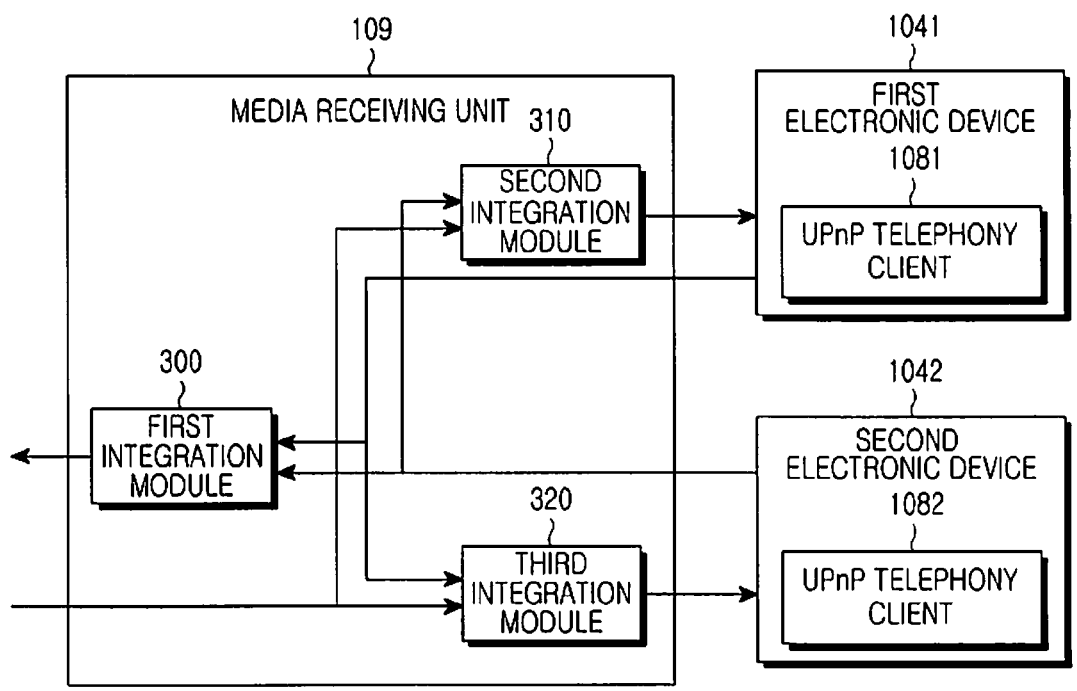
FIG. 3 illustrates a media receiving unit according to an embodiment of the present invention.

FIG. 3 illustrates a media receiving unit according to an embodiment of the present invention.

Referring to FIG. 3, the media receiving unit 109 includes a first integration module (e.g., a transcoder) 300, a second integration module 310 that corresponds to the first electronic device 1041, and a third integration module 320 that corresponds to the second electronic device 1042. The media receiving unit 109 synthesizes or arranges user video and audio signals received from the UPnP telephony clients 1081 and 1082 and determines a transfer path. In this case, the media receiving unit 109 identifies the audio and video signals using session IDs.

Here, the audio and video signals may be transferred as one stream or separately transferred in accordance with the used data format. When separately transferring the audio and video signals, the session IDs are given to the respective streams.

The media receiving unit 109 including the first, second, and third integration modules 300, 310, and 320, integrates the video and audio signals received from the UPnP telephony clients 1081 and 1082 or the video and audio signals received through an input/output device of the telephony terminal 103, and transfers the integrated signals to the telephony core module 105. Additionally, the media receiving unit 109 retransfers external video and audio signals received from the telephony core module 105 to the UPnP telephony clients 1081 and 1082. In this case, the respective UPnP telephony clients 1081 and 1082 can communicate with an external user who has made a phone call, but cannot communicate with another user at home.

Accordingly, in order to communicate with another user at home, the audio and video signals are transferred between the UPnP telephony clients 1081 and 1082 that participate in the call communication.

As described above, the media receiving unit 109 includes the first, second, and third integration modules 300, 310, and 320, the number of which is equal to the number of UPnP telephony servers and telephony clients that participate in the call communication. The first, second, and third integration modules 300, 310, and 320 synthesize or process an input of audio signal transferred from the TV and to synthesize the audio signal of the portable phone and the video signal transferred from the TV to send the synthesized video and audio signals, after intercepting the image signal input from the camera of the portable phone.

As described above, the first, second, and third integration modules 300, 310, and 320 synthesize or intercept the audio and video signals of diverse channels, and thus can control the call data streams transferred from the clients. The user can control the media receiving unit 109 or the first, second, and third integration modules 300, 310, and 320 through the telephony data transfer service by using a local user interface or a remote telephony CP 102.

Data integration may be generally divided into two methods.

The first method combines the audio and video signals, after decoding them, and then encodes the combined audio and video signals. For example, during voice communication, such a simple combination in the transcoding process is sufficient. However, during video telephony, video arrangement information such as video layout should be considered when respective images are combined in the transcoding process.

Specifically, a user can create, change, or delete a video layout by controlling the telephony terminal 103. Thereafter, the media receiving unit 109 integrates the video streams into one video using the changed layout.

Additionally, a user can create, change, or delete a video layout using the telephony CP 102 during call communication. Further, other services, such as a layout changing service may be included in additional services as illustrated in FIG. 1.

The second method performs multiplexing using a header of the RTP when using the RTP for video stream transfer. A stream source can be identified using Synchronization Source telephony Real-time Control (SSRC) and Contributing Source telephony Real-time Control (CSRC) identifiers of RTP, and multiple streams can be multiplexed.

TABLE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|X|    CC     |M|     PT      |        sequence number   |
+-+-+-+-+-+-+-+-+-+-+-+-+-+-+-+-+-+-+-+-+-+-+-+-+-+-+-+-+-+-+-+-+
|                         timestamp                              |
+-+-+-+-+-+-+-+-+-+-+-+-+-+-+-+-+-+-+-+-+-+-+-+-+-+-+-+-+-+-+-+-+
|            synchronization source (SSRC) identifier            |
+=+=+=+=+=+=+=+=+=+=+=+=+=+=+=+=+=+=+=+=+=+=+=+=+=+=+=+=+=+=+=+=+
|             contributing source (CSRC) identifiers             |
|                              ...                               |
+-+-+-+-+-+-+-+-+-+-+-+-+-+-+-+-+-+-+-+-+-+-+-+-+-+-+-+-+-+-+-+-+
``` the audio and video signals, the number of which corresponds to the number that is obtained by subtracting 1 from the number of UPnP telephony servers and telephony clients.

The first, second, and third integration modules 300, 310, and 320 can separate media data into audio data and video data in order to intercept specified audio or video data, in addition to the integration of the call data streams. For example, when a user intends to perform a voice call using a portable phone and to transfer the video using a TV, it is possible to intercept the integration module by separating the When using either of the above-described methods, the telephony CP 102 informs the telephony terminal 103 that the media sessions should be integrated for multi-party communication as illustrated in FIG. 3. There two methods to inform the telephony terminal 103.

The first method determines whether a media stream of another electronic device is included in the set media stream of the media session by adding an EnableMediaMixing element that indicates whether to perform media integration, when the media session of the telephony terminal 103 is determined using StartMediaSession (CallID, MediaSessionID, MediaCapability).

The media receiving unit 109 drives the first, second, and third integration modules 300, 310, and 320 module using the information, integrates (i.e., transcodes or multiplexes) media that is transferred from the electronic device using the media session identified by the CallID and MediaSessionID, and prepares and transfers a single stream to the electronic device. For example, when the value of EnableMediaMixing is set to 1, as shown in Table 3 below, the media receiving unit 109 can integrate the received media streams.

TABLE 3

```
<?xml version="1.0" encoding="UTF-8"?>
<MediacapabilityInfo>
    <EnableMediaMixing>1<EnablemediaMixing>
    <mediacapability mediaformat="SDP">
        v=0
        o=- 0 0 IN IP4 10.35.195.2
        s=-
        c=IN IP4 10.35.195.2
        t=0 0
        m=audio 5004 RTP/AVP 0
        a=rtpmap:0 PCMU/8000
        m=video 5006 RTP/AVP 96
        b=AS:48
        a=rtpmap:96 MP4V-ES/90000
        a=fmtp:96 profile-level-id=8
        m=application 9 TCP soap+xml
        a=setup:active
        a=connection:new
    </mediacapability>
</MediaCapabilityInfo>
```

The second method for informing the telephony terminal 103 determines that the media stream of the media session can be transferred to another electronic device using a separate action such as EnableMediaMixing (CallID, MediaSessionID).

Once the action is received, the media receiving unit 109 drives the first, second, and third integration modules 300, 310, and 320 using the information, and provides a single stream by integrating (i.e., transcoding or multiplexing) media that is identified by CallID and MediaSessionID and media that is transferred to the first and second electronic devices 1041 and 1042.

When the first, second, and third integration modules 300, 310, and 320 are all included in the media receiving unit 109, it is not necessary to change the UPnP telephony clients 1081 and 1082, and by supplementing the structure and operation of the call transfer agent 107, multiple calls can be transferred. That is, because the call transfer agent 107 in accordance with the present invention enables the multiple calls, conventional first and second electronic devices 1041 and 1042 can be used.

Figure 4:
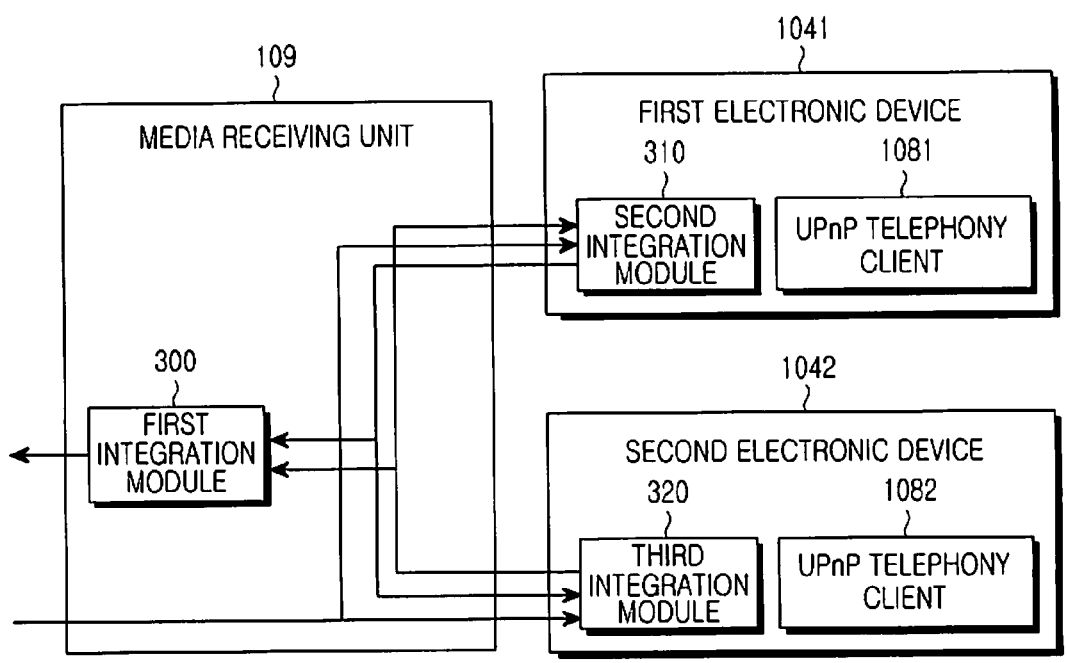
FIG. 4 illustrates a media receiving unit according to an embodiment of the present invention.

FIG. 4 illustrates a media receiving unit according to an embodiment of the present invention.

Referring to FIG. 4, the media receiving unit 109 includes only a first integration module 300, while a first electronic device 1041 includes a second integration module 310 and a UPnP telephony client 1081, and a second electronic device 1042 includes a UPnP telephony client 1082 and a third integration module 320. Specifically, in FIG. 4, each of the media receiving unit 109 and the first and second electronic devices 1041 and 1042 has one integration module, receives all the audio and video signals sent from other devices that participate in the call communication as they are, and internally integrates the received signals.

Assuming that a call communication is performed using two electronic devices, as illustrated in FIG. 4, the following sessions are provided.

1. first electronic device 1041—telephony terminal 103: bidirectional session.

2. second electronic device 1042—telephony terminal 103: bidirectional session.

3. first electronic device 1041—telephony terminal 103: receive stream coming from the second electronic device, unidirectional session.

4. second electronic device 1042—telephony terminal 103: receive stream coming from the first electronic device, unidirectional session.

Although the UPnP telephony session basically supports the bidirectional stream transfer, the UPnP telephony session can support the unidirectional session when communicating using HTTP, as illustrated in FIG. 4.

If another electronic device participates in the above-described telephony session, while the first and second electronic devices 1041 and 1042, which are session-connected, perform the call communication as described above, the total number of sessions becomes 9.

When N electronic devices participate in the telephony session, the total number of sessions becomes N (session with the telephony terminal)+N(N−1) (the number of streams to be received from the remaining electronic devices, except for the corresponding electronic device itself). Accordingly, if N electronic devices exist, the total number of possible sessions becomes $N^2$ (where, N is a natural number).

When determining the above-described unidirectional stream session, the UPnP telephony CP 102 informs the telephony terminal 103 that the above session is for sharing the media between the first and second electronic devices 1041 and 1042. The UPnP telephony CP 102 may inform the telephony terminal 103 of the session type using the two methods.

The first method adds a shareMedia element for indicating the media session of which sharing is desired, when the media session of the telephony terminal 103 is determined using StartMediaSession (CallID, MediaSessionID, MediaCapability), and includes the MediaSessionID as the ShareMedia element. The telephony terminal 103 transfers media that corresponds to MediaSessionID indicated in ShareMedia of MediaCapability.

TABLE 4

```
<?xml version="1.0" encoding="UTF-8"?>
<MediacapabilityInfo>
    <ShareMedia>MediaSessionID<ShareMedia>
    <mediacapability mediaformat="SDP">
        v=0
        o=- 0 0 IN IP4 10.35.195.2
        s=-
        c=IN IP4 10.35.195.2
        t=0 0
        m=audio 5004 RTP/AVP 0
        a=rtpmap:0 PCMU/8000
        m=video 5006 RTP/AVP 96
        b=AS:48
        a=rtpmap:96 MP4V-ES/90000
        a=fmtp:96 profile-level-id=8
        m=application 9 TCP soap+xml
        a=setup:active
        a=connection:new
    </mediacapability>
</MediaCapabilityInfo>
```

The second method for the UPnP telephony CP 102 to inform the telephony terminal 103 of the session type determines if the media stream of the media session can be transferred to another electronic device using a separate action such as EnableMediaTransfer (CallID, sourceMediaSessionID, sinkMediaSessionID). That is, information that indicates the ID of the session formed with the electronic device that intends to share the media, when the media session is set together with the telephony terminal 103, is to be transferred to another electronic device.

Once the action is received, the media receiving unit 109 drives the first integration module 300, and transfers both the media that is identified by CallID and sourceMediaSessionID and the media that is transferred to the first and second electronic devices 1041 and 1042 to the session that corresponds to sinkMediaSessionID. In this case, the layout of the video signal that is transferred to the UPnP telephony clients 1081 and 1082 is not determined by the media receiving unit 109, but can be selected and changed in the first and second electronic devices 1041 and 1042 themselves.

The method performed by the system illustrated in FIG. 4 can be adopted when the media is transferred using a transfer protocol other than RTP, e.g., a transfer protocol that does not multiplex the media, such as HTTP.

Figure 5:
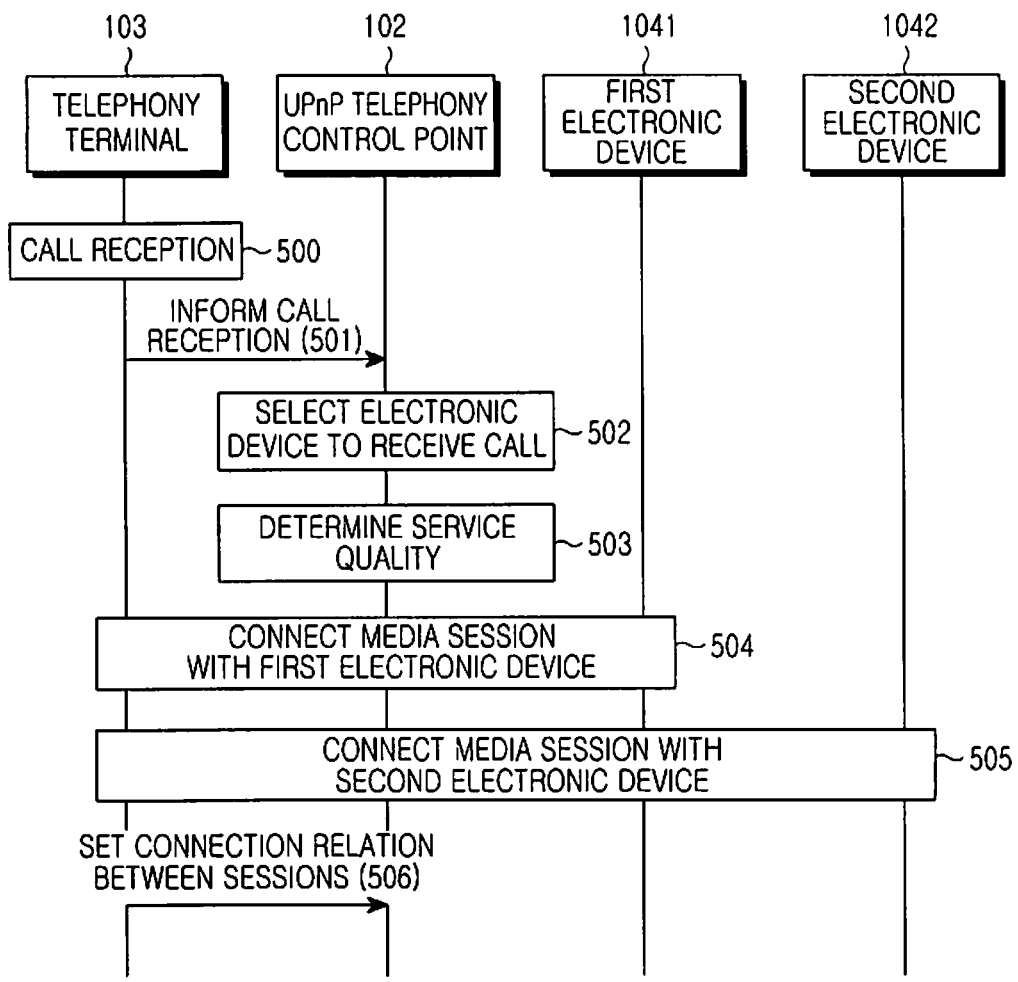
FIG. 5 is a signal flowchart illustrating a process for receiving a call according to an embodiment of the present invention.

FIG. 5 is a signal flowchart illustrating a process for receiving a call in a system providing phone related services according to an embodiment of the present invention.

Specifically, in FIG. 5, each of the first electronic device 1041 and the second electronic device 1042 includes an integration module as illustrated in FIG. 4.

Referring to FIG. 5, the telephony terminal 103 receives a call in step 500, and informs the UPnP telephony CP 102 that the call is received in step 501. Here, the telephony terminal 103 notifies the UPnP telephony CP 102 of the call reception in a similar manner as the conventional art.

In step 502, the UPnP telephony CP 102 selects an electronic device for the call reception by a user, and in step 503, determines the quality of a communication service in order to efficiently use the currently available network resources. In this case, the quality of the communication service is determined using Quality of Service (QoS) control.

When determining the quality of communication service as described above, the number of UPnP telephony clients to be currently connected, the total bandwidth that can be supportable in the current home network, the priority among the UPnP telephony clients, etc., are considered. In this case, in order to guarantee the QoS, UPnP QoS pre-defined by UPnP is used.

In step 504, the UPnP telephony control point 102 connects a media session with the first electronic device 1041, and in step 505, connects a media session with the second electronic device 1042. Because two UPnP telephony clients exist at present, the phone related services providing system has two available sessions: one for transfer/reception and the other for reception only.

The connection between such sessions may be set in step 506 using MediaCapability or an action such as EnableMediaTransfer (CallID, sourceMediaSessionID, sinkMediaSession) that can set a connection relation between sessions.

Figure 6:
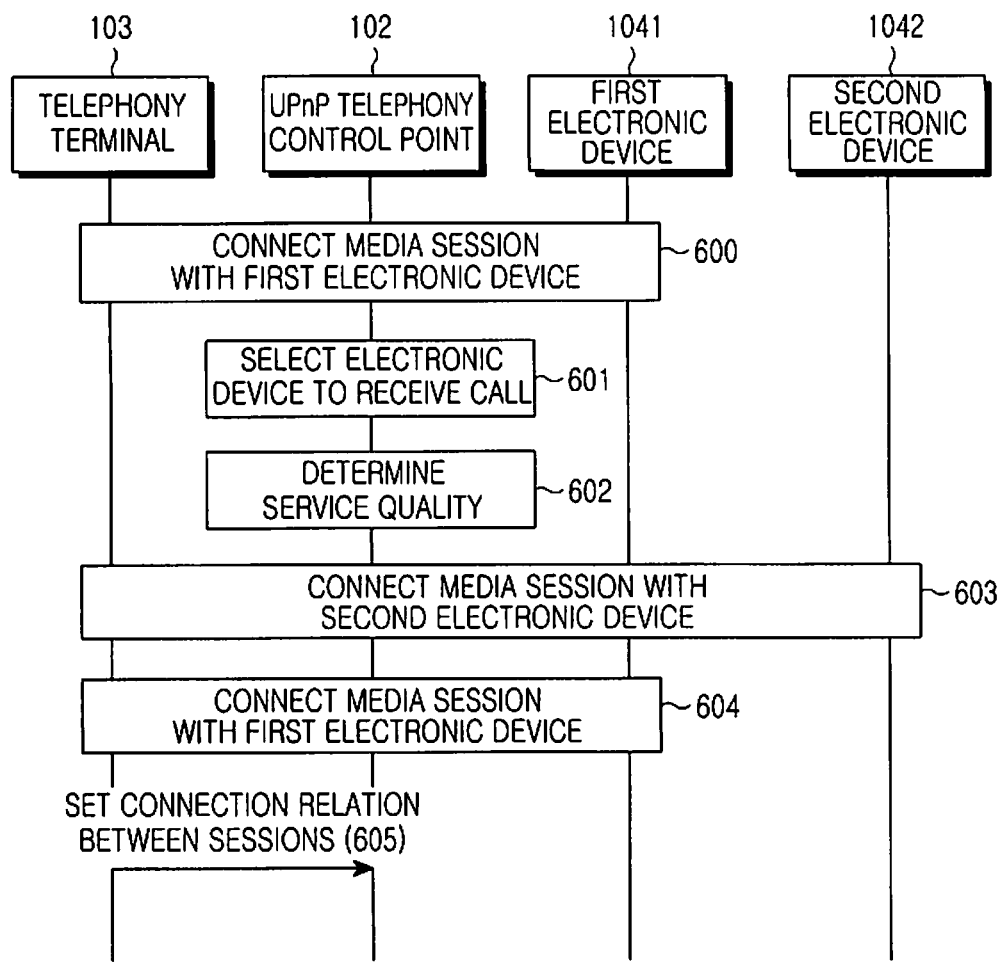
FIG. 6 is a signal flowchart illustrating a process for making a new electronic device participate in a current call according to an embodiment of the present invention.

FIG. 6 is a signal flowchart illustrating a process for making a new electronic device participate during a current call in a system for providing phone related services according to an embodiment of the present invention. For example, it may be assumed that a user intends to participate in the reception of a currently proceeding call using a digital TV during a call communication using an audio device.

A media session is established between the telephony terminal 103 and the first electronic device 1041 in step 600. When the UPnP telephony CP 102 identifies a second electronic device 1042 that has newly entered into a network iduring the media session with the first electronic device 1041, the UPnP telephony CP 102 determines to make the second electronic device 1042 participate in the call communication in step 601.

In step 602, the UPnP telephony CP 102 determines the quality of communication service, as in step 503 in FIG. 5, and connects a media session between the second electronic device 1042 and the telephony terminal 103 in step 603. Here, because the audio and video signals generated in the second electronic device 1042 are received in the first electronic device 1041 through the telephony terminal 103 and the audio and video signals are received in the second electronic device 1042, an operation for confirming and adjusting the capability between the first electronic device 1041 and the second electronic device 1042 is performed. In this case, the operation for confirming and adjusting the capability between the devices in order to determining the quality of communication service is performed in the same manner as that in the related art, the detailed description thereof will be omitted.

In step 603, a session is connected between the telephony terminal 103 and the second electronic device 1042, and a new session is added between the telephony terminal 103 and the first electronic device 1041. In step 604, the telephony terminal 103 transfers the audio and video signals received from the second electronic device 1042 to the first electronic device 1041 using the newly added session.

The connection between the newly added sessions may be set in step 605 using the MediaCapability or using the action such as EnableMediaTransfer (CallID, sourceMediaSessionID, sinkMediaSessionID).

Figure 7:
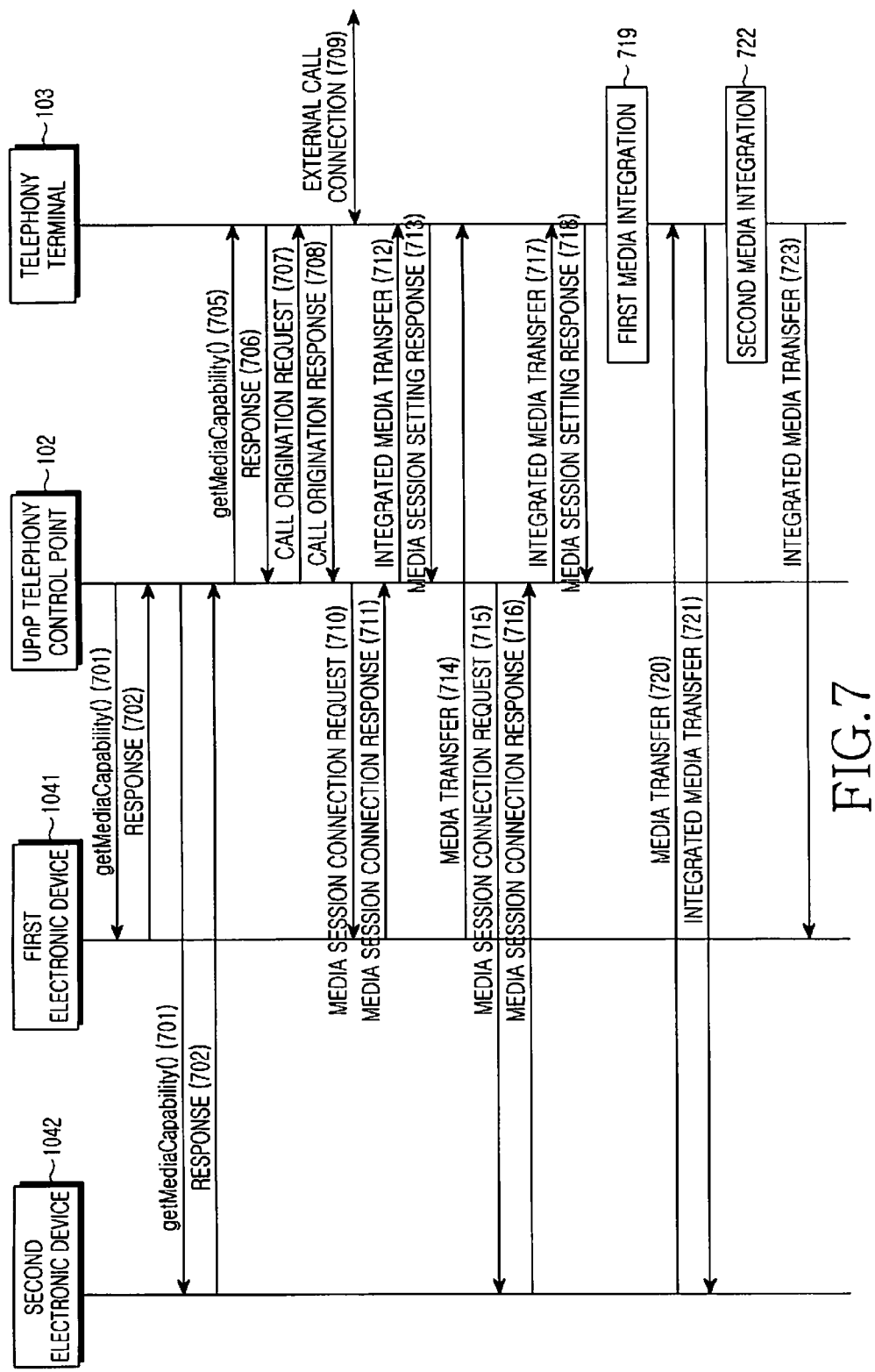
FIG. 7 is a signal flowchart illustrating a process for connecting media sessions with multiple electronic devices using a Real-time Transport Protocol (RTP) according to an embodiment of the present invention.

FIG. 7 is a signal flowchart illustrating a process for connecting media sessions with electronic devices using RTP according to an embodiment of the present invention. In FIG. 7, the first and second electronic devices 1041 and 1042 do not include any integration modules; the integration modules are included in the telephony terminal 103 as illustrated in FIG. 3.

In steps 700 to 706, the UPnP telephony CP 102 collects capability information of media that can be supported by the first electronic device 1041, the second electronic device 1042, and the telephony terminal 103 using getMediaCapability( ) action. Thereafter, the UPnP telephony CP 102 determines the media capability information that is available in the home network by analyzing the collected capability.

The UPnP telephony CP 102 requests a call origination using the determined media capability information in step 707, and the telephony terminal 103 responds to this in step 708, and performs an external call connection to give CallID to the external session in step 709.

The UPnP telephony CP 102 requests a media session connection from the first electronic device 1041, based on the given CallID and the media capability information, in step 710, and in step 711, the first electronic device 1041 returns the session ID to the UPnP telephony CP 102 in response to the request.

The UPnP telephony CP 102 requests the media session setting from the telephony terminal 103 using the returned session ID in step 712, and the telephony terminal 103 responds to this in step 713. In this case, as shown in Table 1, the value of SEQReordering element is set to 1.

In the above-described set state, the telephony terminal 103 integrates the media received from the outside through the set session and the media received from the first electronic device 1041, which has set the value of SEQReordering element to 1, and transfers the integrated media to the respective electronic devices. In this case, the media integration may be performed using a multiplexing method provided by RTP.

In step 714, the first electronic device 1041 transfers the media to the telephony terminal 103 through the connected session. In general, the UPnP telephony, i.e., the UPNP CP 102, bidirectionally sends and receives the media through the media session, but in step 714, it is assumed that the first electronic device 1041 only transfers the media rather than receives the media.

The UPnP telephony CP 102 requests the media session connection from the second electronic device 1042 in step 715, and the second electronic device 1042 returns the session ID to the UPnP telephony control point 102 in response to the request in step 716.

The UPnP telephony CP 102 requests the media session setting from the telephony terminal 103 using the returned session ID in step 717, and the telephony terminal 103 responds to this in step 718. In this case, as shown in Table 3, the value of SEQReordering element is set to 1. That is, the UPnP telephony CP 102 requests the media stream transfer from the second electronic device 1042, and requests the media exchange with the second electronic device 1042 from the telephony terminal 1042.

In step 719, the telephony terminal 103 integrates the media received from the first electronic device 1041 and the media received from the outside to transfer the integrated media to the second electronic device 1042.

The second electronic device 1042 transfers the media to the telephony terminal 103 in step 720, and the telephony terminal 103 transfers the media integrated in step 719 to the second electronic device 1042 in step 721.

The telephony terminal 103 integrates the media received from the second electronic device 1042 and the media received from the outside in step 722, and transfers the integrated media to the first electronic device 1041 in step 723.

As described above, according to an embodiment of the present invention, because media is integrated using the RTP and the media is transferred/received between multiple electronic devices, the call communication can be made between the electronic devices.

Figure 8:
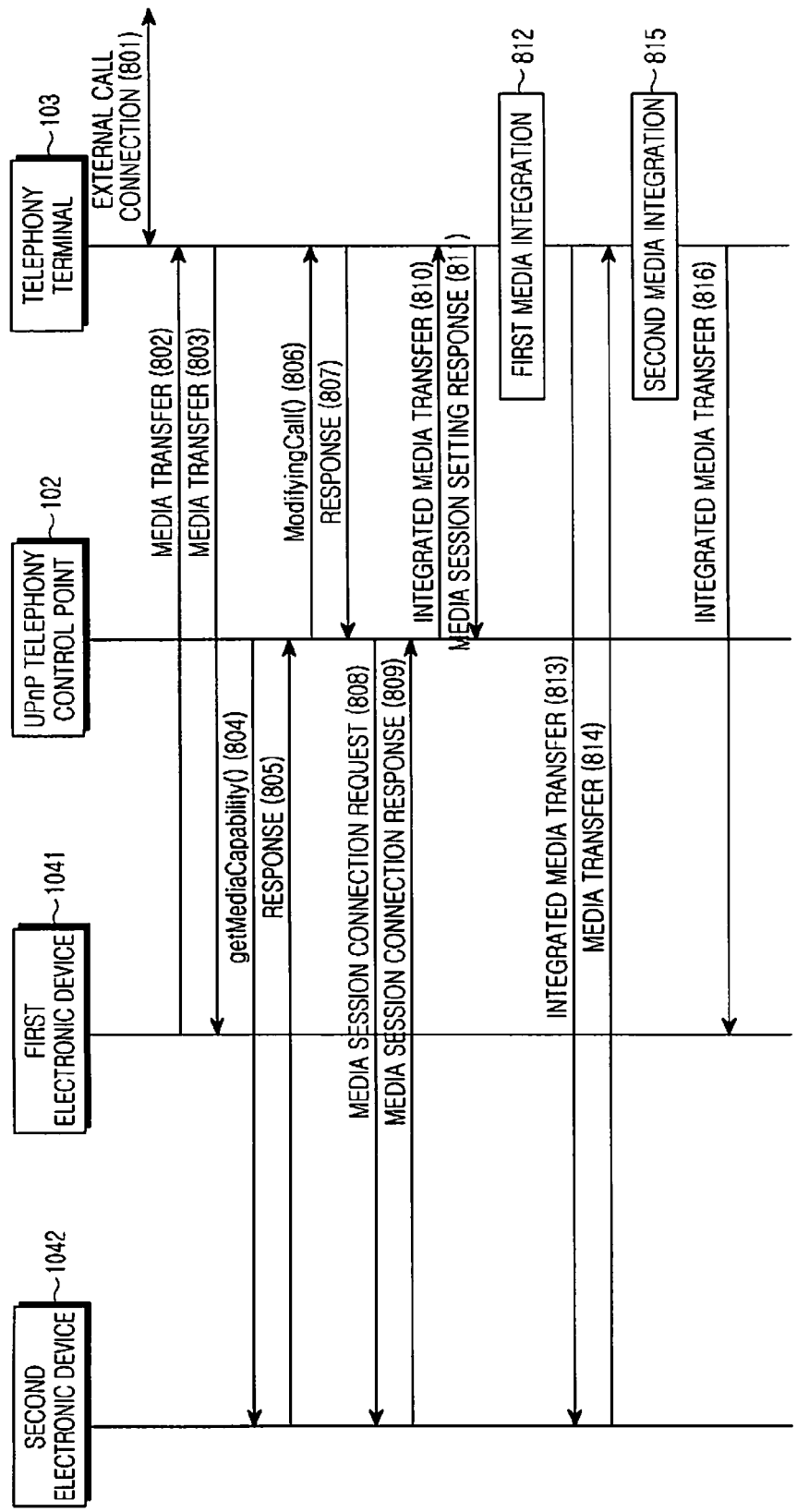
FIG. 8 is a signal flowchart illustrating a process for making a new electronic device participate during a call connection between electronic devices using RTP according to an embodiment of the present invention.

FIG. 8 is a signal flowchart illustrating a process of making a new electronic device participate during the call connection between the plural electronic devices using RTP according to an embodiment of the present invention. In FIG. 8, it is assumed that a user performs a call communication with the outside using the first electronic device 1041.

Additionally, as in FIG. 7, in FIG. 8, the first and second electronic devices 1041 and 1042 do not include any integration modules; the integration modules are included in the telephony terminal 103 as illustrated in FIG. 3.

Referring to FIG. 8, in steps 801 to 803, the first electronic device 1041, the telephony terminal 103, and the outside perform call communication with each other.

In steps 804 and 805, the UPnP telephony CP 102 requests and collects the media capability of the second electronic device 1042 using getMediaCapability( ) action of the second electronic device 1042. Then, the UPnP telephony CP 102 determines the media capability information that is usable in the home network by analyzing the collected capability information.

In steps 806 and 807, the UPnP telephony CP 102 is set to share the media received through the existing sessions using ModifyCall( ) action. In this case, as shown in Table 3, the value of SEQReordering element is set to 1.

The UPnP telephony CP 102 request the media session connection from the second electronic device 1042 based on the media capability information in step 808, and in response to the request, the second electronic device 1042 returns the session ID to the UPnP telephony CP 102 in step 809.

The UPnP telephony CP 102 requests the media session setting from the telephony terminal 103 using the received session ID in step 809, and the telephony terminal 103 responds to this in step 811. In this case, as shown in Table 3, the value of SEQReordering element in MediaCapability is set to 1, and thus the media transferred to the telephony terminal 103 through the newly set session is set to be transferred to the second electronic device 1042.

The telephony terminal 103 integrates the media received from the outside and the media received from the first electronic device 1041 in step 812, and transfers the integrated media to the second electronic device 1042 in step 813.

The second electronic device 1042 transfers the media to the telephony terminal 103 in step 814.

The telephony terminal 103 integrates the media received from the second electronic device 1042 and the media received from the outside in step 815, and transfers the integrated media to the first electronic device 1041 in step 816.

As described above, according to an embodiment of the present invention, because the media is integrated using the RTP and is transferred/received between multiple electronic devices, it is possible to provide the call communication between the multiple electronic devices.

Figure 9:
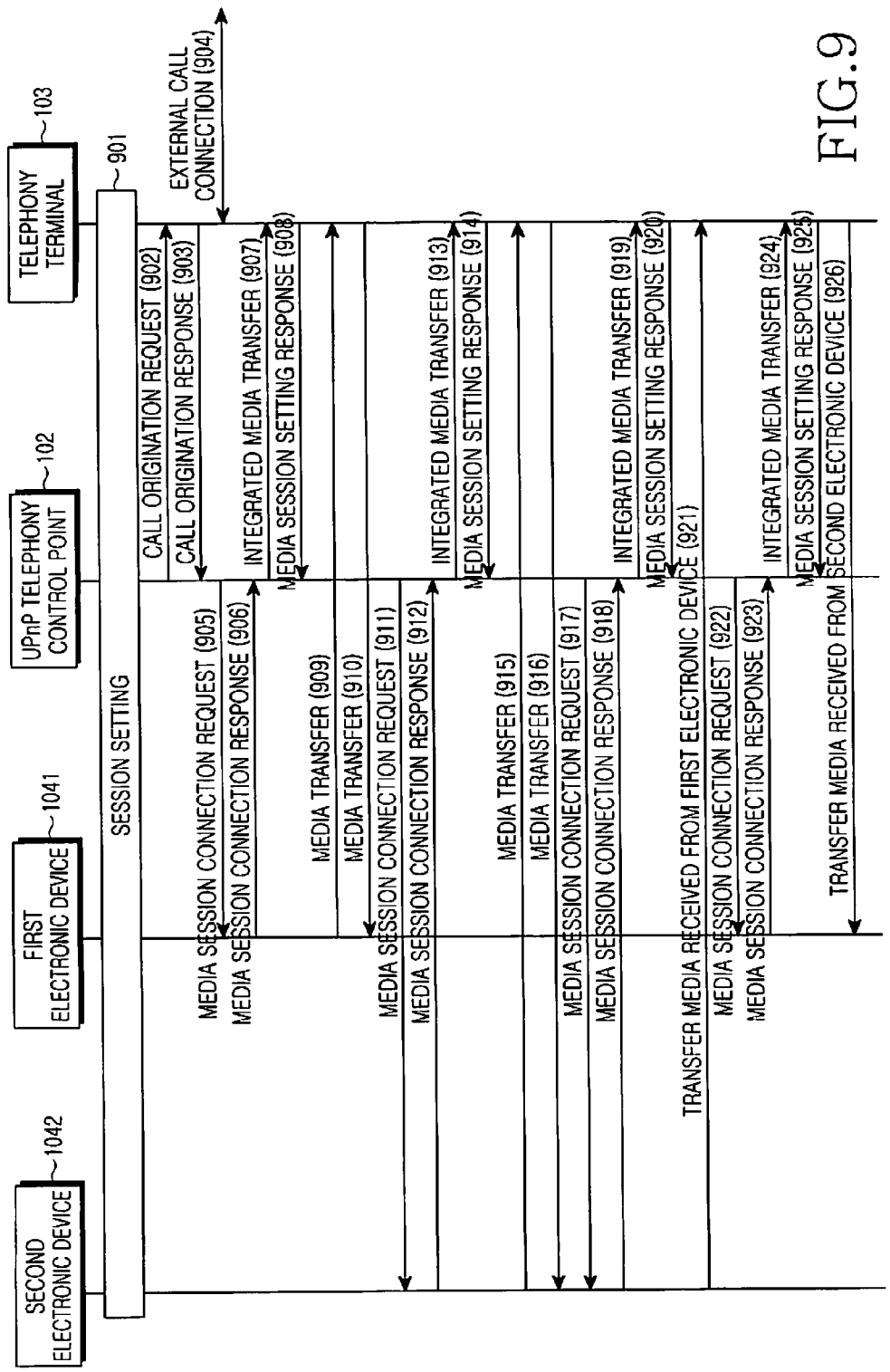
FIG. 9 is a signal flowchart illustrating a process for connecting media sessions with electronic devices using a Hyper-Text Transfer Protocol (HTTP) according to an embodiment of the present invention.

FIG. 9 is a signal flowchart illustrating a process for connecting media sessions with multiple electronic devices using HTTP according to an embodiment of the present invention.

In steps 901 to 916, the UPnP telephony CP 102 sets the session with the first electronic device 1041, the second electronic device 1042, and the outside, and transfers/receives media data through the set session. Because such session setting and media transfer are the same as the session setting and media transfer processes as described above with reference to FIGS. 7 and 8, a repetitive detailed description thereof will be omitted below.

In step 917, the UPnP telephony CP 102 transfers the request for connecting the media session, which is for transferring the media that the telephony terminal 103 has received from the first electronic device 1041 to the second electronic device 1042, to the second electronic device 1042. In this case, because the UPnP telephony CP 102 has already determined the media capability information of the first electronic device 1041 and the second electronic device 1042, it can transfer the media through the above-described process.

In step 918, the second electronic device 1042 transfers a response to the media session connection request.

The UPnP telephony CP 102 requests the media session setting from the telephony terminal 103 in step 919, and the telephony terminal 103 transfers a response to the request in step 920. In this case, the UPnP telephony CP 102 can set MediaSessionID of the media to be transferred to MediaCapability as shown in Table 4.

Because HTTP does not support multiplexing, unlike RTP, HTTP requires additionally establishing a session to share the media. By describing MediaSessionID of the media to be shared as the value of the ShareMedia element in MediaCapability, the media transferred from the respective electronic device can be transferred to other electronic devices. When using such a method, it is possible to perform the control for the respective media.

In step 921, the telephony terminal 103 transfers the media received from the first electronic device 1041 to the second electronic device 1042.

Steps 922 to 925 are the same as steps 917 to 920 as described above, and the UPnP telephony CP 102 sets an addition session between the first electronic device 1041 and the telephony terminal 103.

In step 926, the telephony terminal 103 transfers the media received from the second electronic device 1042 to the first electronic device 1041.

As described above, according to an embodiment of the present invention, because the media is integrated using HTTP and is transferred/received between multiple electronic devices, it is possible to provide the call communication between the multiple electronic devices.

Figure 10:
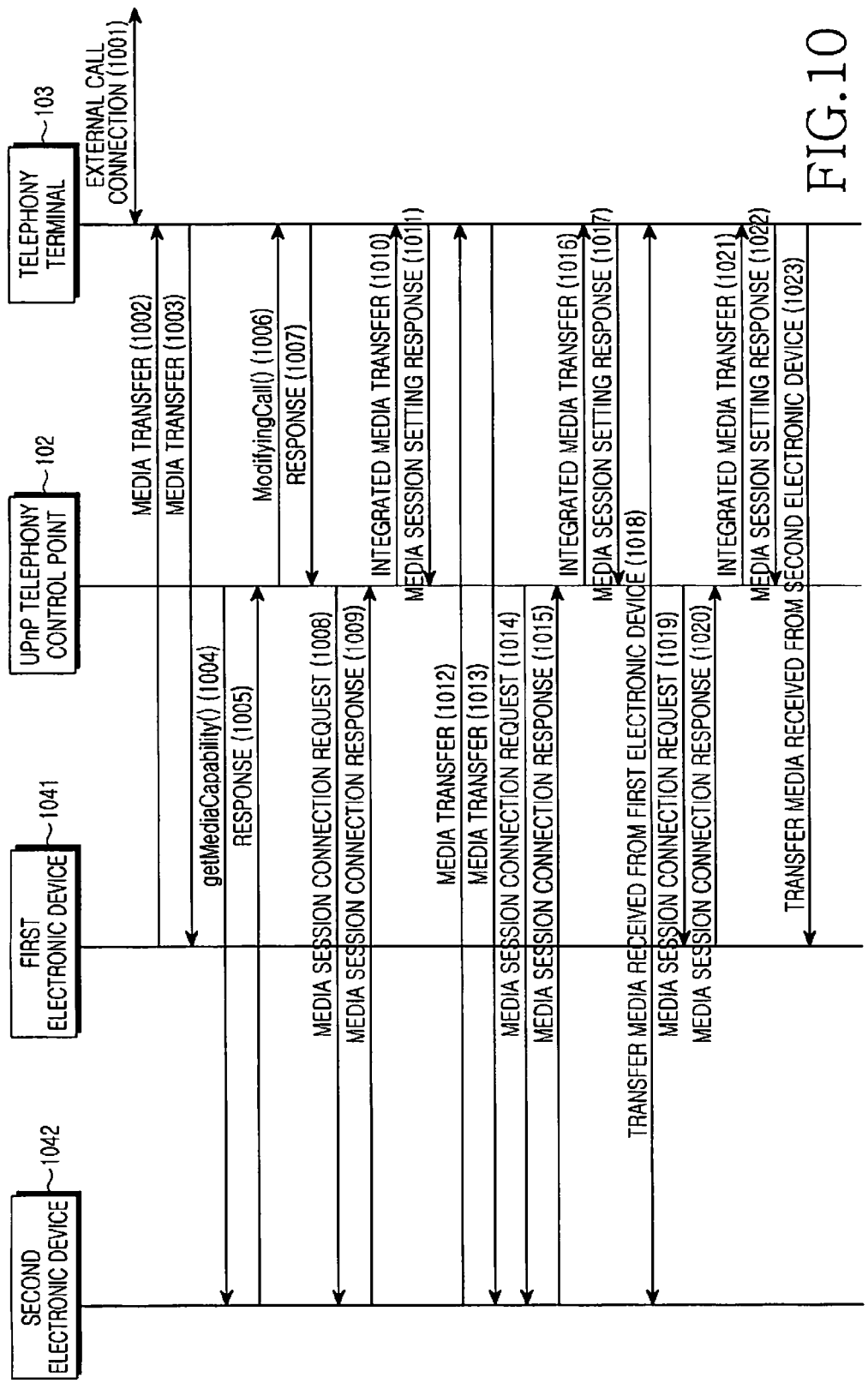
FIG. 10 is a signal flowchart illustrating a process for making a new electronic device participate during a call connection between electronic devices using HTTP according to an embodiment of the present invention.

FIG. 10 is a signal flowchart illustrating a process for making a new electronic device participate during a call connection between electronic devices using HTTP according to an embodiment of the present invention.

Referring to FIG. 10, in steps 1001 to 1003, the first electronic device 1041, the telephony terminal 103, and the outside perform call communication with each other.

In steps 1004 and 1005, the UPnP telephony CP 102 requests and collects the media capability of the second electronic device 1042 using getMediaCapability( ) action of the second electronic device 1042. Then, the UPnP telephony CP 102 determines the media capability information that is usable in the home network by analyzing the collected capability information.

In steps 1006 and 1007, the UPnP telephony CP 102 is set to share the media received through the existing sessions using ModifyCall( ) action. In this case, as shown in Table 4, the value of SEQReordering element is set to 1.

Because steps 1008 to 1023 are the same as steps 911 to 926, which were already described above, a repetitive detailed description thereof will be omitted below.

As described above, according to an embodiment of the present invention, because the media is integrated using HTTP and is transferred/received between multiple electronic devices, it is possible to provide the call communication between the multiple electronic devices.

Figure 11:
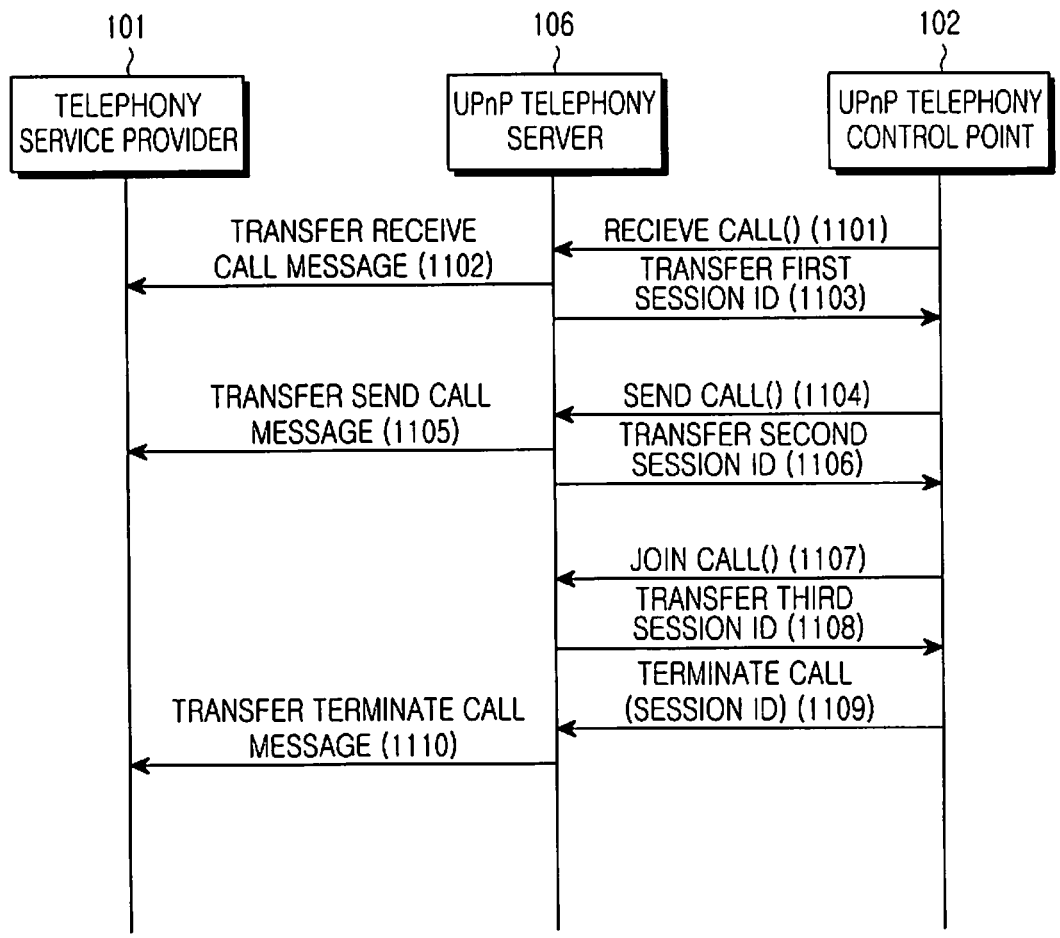
FIG. 11 is a signal flow chart illustrating a process in which an available call control signal is transferred and received according to an embodiment of the present invention.

FIG. 11 is a signal flow chart illustrating a process in which an available call control signal is transferred/received according to an embodiment of the present invention. Specifically, using such a call control signal, the UPnP telephony CP 102 can control the call control service of a UPnP telephony server 106, and controls a telephony core module 105 to transfer call related information to the telephony service provider 101.

Referring to FIG. 11, in step 1101, the UPnP telephony CP 102 transfers ReceiveCall( ) action to the UPnP telephony server 106 to transfer an intention to receive the phone call while the phone bell is ringing.

In step 1102, the UPnP telephony server 106 transfers the ReceiveCall message to the telephony service provider 101 through an interface provided by the telephony service provider 101. If the ReceiveCall message is transferred, the UPnP telephony server 106 processes the ReceiveCall message using the telephony core module 105, and then performs streaming of the call data using the call transfer agent 108.

If the ReceiveCall( ) action is received while proceeding with the call communication using the clients, the UPnP telephony server 106 assigns the first session ID through the UPnP telephony CP 102 in step 1103, and using this, identifies the call data session at home using the first session ID.

In step 1104, the UPnP telephony CP 102 transfers the SendCall( ) action to the UPnP telephony server 106 in order to transfer a message notifying the sending of a call together with a phone number.

In step 1105, the UPnP telephony server 106 transfers the SendCall( ) message to the telephony service provider 101 using the interface provided by the service provider 101. If the SendCall( ) message is transferred, the UPnP telephony server 106 processes the SendCall( ) message using the telephony core module 105, and then performs streaming of the call data using the call transfer agent 108. At this time, even if the call is not completely connected to a receiver, the call transfer agent 108 of the UPnP telephony server 106 can stream the ring sound to the call transfer agent 108 of the UPnP telephony client 109.

If the SendCall( ) action is received while proceeding with the call communication using the multiple clients, the UPnP telephony server 106 assigns the second session ID through the UPnP telephony control point 102 in step 1106, and using this, identifies the call data session at home using the first session ID. For this, however, it is required that the telephony terminal 103 has plural telephony core modules 105 built therein or a single telephony core module 105 that supports multiple simultaneous call communications. The telephony clients 1081 and 1082 are connected to the same telephony server 106, but transfer/receive separate, distinct calls.

In step 1107, the UPnP telephony CP 102 uses and transfers JoinCall( ) action to the UPnP telephony server 106 in order to transfer a message notifying the participation in the call communication while the clients perform the phone call communications. The UPnP telephony server 106, having received the JointCall( ) action, assigns the third session ID through the UPnP telephony CP 102 in step 1108, and using this, discriminates the call data sessions at home. A user can participate in the currently proceeding call communication through the JointCall( ).

In step 1109, the UPnP telephony CP 102 transfers a TerminateCall( ) action to the UPnP telephony server 106 in order to transfer a message notifying of the call termination. In step 1110, the UPnP telephony server 106 transfers the TerminateCall( ) message to the telephony service provider 101 using the interface provided by the telephony service provider 101. If the TerminateCall( ) message is transferred, the UPnP telephony server 106 processes the TerminateCall( ) message using the telephony core module 105, and then terminates the streaming of the call data using the call transfer agent 108.

A process of terminating a call connection for the call communication using the multiple clients will be hereinafter described in more detail.

For example, it is assumed that a single user performs a voice call using a portable phone, and transfers video using a TV.

If a UPnP telephony CP 102 intends to terminate the call in any one of a portable phone or a TV, the UPnP telephony CP 102 executes TerminateCall(Session ID) action that includes a session ID connected to the current UPnP telephony server 106. In this case, the call control service of the telephony terminal 103 can be identified as two types according to the policy.

In the first type, the telephony terminal 103 controls the telephony core module 105 to transfer a termination signal to the telephony service provider 101, and terminates the session with all the clients including the portable phone in which the UPnP telephony server is currently built.

In the second type, the telephony terminal 103 officially announces the termination of one session to all the clients including the portable phone in which the UPnP telephony server 106 is currently built, where the connection with the telephony service provider 101 is maintained, without controlling the telephony core module 105.

This operation is performed in the same manner as when multiple users proceed with the call communication using multiple equipment.

When participating in the currently used call session using another client, the UPnP telephony CP 102 forms a new session using JointCall( ) action, and is assigned with a session ID. At this time, the integration module of the telephony terminal 103 integrates and transfers the input from the new session to the telephony service provider 101, where the current connection with the telephony service provider 101 is maintained. Also, the integration module of the telephony terminal 103 integrates the call data coming from the telephony service provider 101 and the audio and video transmitted from the existing client to transfer the integrated data to a new client. Also, for termination, the integration module terminates the phone call communication using the session ID.

As described above, according to the present invention, if multiple devices exist on a home network, the phone call from the outside is divided into audio and video in accordance with the capabilities of the respective devices to be transferred and received, or multiple users simultaneously participate in the same phone call communication, so that the multiple electronic devices can communicate with each other in a single telephony terminal.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for multi-call connection in a first network telephony control point, comprising:
   requesting media capability information indicating supportable media information to a telephony terminal and a plurality of electronic devices including a first electronic device and a second electronic device existing in the first network;
   receiving the requested media capability information from the telephony terminal and the plurality of electronic devices in the first network;
   selecting media capability information used for multi-call service from the received media capability information;
   configuring a first multi-call connection of the telephony terminal and the first electronic device, and a second multi-call connection of the telephony terminal and the second electronic device, the first and second multi-call connections being configured with reference to the selected media capability information; and
   performing multi-call control for the multi-call connection-configured telephony terminal and the first and second electronic devices,
   wherein the telephony terminal and the plurality of electronic devices are included in the first network corresponding to the first network telephony control point.

2. The method of claim 1, further comprising:
   receiving an event, which notifies of reception of a call, from the telephony terminal, before requesting the media capability information, when receiving the call.

3. The method of claim 1, wherein the media capability information requested to the telephony terminal includes transfer information indicating a multi-call transfer scheme.

4. The method of claim 3, wherein the multi-call transfer scheme comprises an integration transfer scheme for integrating multiple pieces of call data into multi-call data and then transferring the multi-call data and a session transfer scheme for configuring a session for the multi-call data and then transferring the multi-call data according to the configured session.

5. The method of claim 1, wherein configuring the first multi-call connection of the telephony terminal and the first electronic device, the second multi-call connection of the terminal and the second electronic device comprises identifying the transfer information and transferring a configuration message for configuring such that multi-call data is transferred according to a multi-call transfer scheme supportable by the telephony terminal, to the telephony control point.

6. The method of claim 4, wherein performing the multi-call control for the telephony terminal and the plurality of electronic devices comprises:
   integrating multi-call data by the telephony terminal when the multi-call transfer scheme is the integration transfer scheme; and
   controlling to transfer the integrated multi-call data to the first electronic device and the second electronic device.

7. The method of claim 4, wherein performing the multi-call control for the telephony terminal and the plurality of electronic devices comprises:
   configuring multiple sessions for call transfer when the multi-call transfer scheme is the session transfer scheme; and
   transferring the multi-call data through the configured multiple sessions, respectively.

8. A method for multi-call connection in a first network telephony terminal, comprising:
   receiving a request for media capability information indicating supportable media information from a telephony control point;
   transmitting the requested media capability information to the telephony control point;
   configuring a first multi-call connection of a first electronic device in the first network to a telephony terminal and a second multi-call connection of a second electronic device in the first network to the telephony terminal, the first and second multi-call connections being configured with reference to the requested media capability information; and
   performing multi-calls of the first electronic device and the second electronic device,
   wherein the telephony terminal, the first electronic device and the second electronic device are included in the first network corresponding to the first network telephony control point.

9. The method of claim 8, further comprising:
   recognizing reception of a call, before receiving the request for the media capability information, when receiving the call; and
   transmitting an event, which notifies of reception of the call, to the telephony control point.

10. The method of claim 8, wherein the media capability information requested to the telephony control point includes transfer information indicating a supportable multi-call transfer scheme.

11. The method of claim 10, wherein the multi-call transfer scheme comprises an integration transfer scheme for integrating multiple pieces of call data into multi-call data and then transferring the multi-call data and a session transfer scheme for configuring a session for the multi-call data and then transferring the multi-call data according to the configured session.

12. The method of claim 11, wherein configuring the multi-call connection comprises:
   receiving a configuration message for configuring such that the multi-call data is transferred from the telephony control point according to a multi-call transfer scheme; and
   configuring the multi-call connection according to the multi-call transfer scheme included in the received configuration message.

13. The method of claim 11, wherein performing the multi-call of the first electronic device and the second electronic device comprises:
 integrating the multi-call data when the multi-call transfer scheme is the integration transfer scheme; and
 transferring the integrated multi-call data to the first electronic device and the second electronic device.

14. The method of claim 11, wherein performing the multi-call of the first electronic device and the second electronic device comprises:
 configuring a session for call transfer with the telephony terminal when the multi-call transfer scheme is the session transfer scheme; and
 receiving call data through the configured session.

15. A method for media session connection in a first electronic device located in a first network, comprising:
 receiving a request for media capability information indicating supportable media information from a telephony control point;
 transmitting the requested media capability information to the telephony control point;
 connecting a first media session with a telephony terminal; and
 controlling the first electronic device in the first network together with the connection-configured telephony terminal,
 wherein the telephony terminal and the first electronic device are included in the first network corresponding to the first network telephony control point.

16. The method of claim 15, further comprising:
 transmitting an event, which notifies of reception of a call, to the telephony control point, before receiving the request for the media capability information, when receiving the call.

17. The method of claim 15, wherein connecting the first media session with the telephony terminal comprises:
 starting to transmit and receive a media stream when a message for starting of the media session has been received from the telephony control point; and
 transmitting media session information indicating a media session state to the telephony control point.

18. The method of claim 15, wherein controlling the first electronic device together with the connection-configured telephony terminal comprises:
 controlling one or more combinations of starting of media transmission to the connection-configured telephony terminal, media session change, and media transmission termination.

19. A method for first network telephony multi-call service, comprising:
 requesting, by a telephony control point, media capability information indicating supportable media information to a telephony terminal and a plurality of electronic devices in the first network including a first electronic device and a second electronic device;
 transmitting the requested media capability information to the telephony control point by the telephony terminal and the plurality of electronic devices;
 receiving the requested media capability information and selecting media capability information used for multi-call service from the received media capability information by the telephony control point;
 configuring, by the telephony control point, a first multi-call connection of the telephony terminal and the first electronic device in the first network, and a second multi-call connection of the telephony terminal and the second electronic device in the first network, the first and second multi-call connections being configured with reference to the selected media capability information; and
 performing, by the telephony point, multi-call control for the multi-call connection-configured telephony terminal and the plurality of electronic devices,
 wherein the telephony terminal, the first electronic device and the second electronic device are included in the first network corresponding to the first network telephony control point.

20. The method of claim 19, further comprising:
 before transmitting the request for the media capability information to the telephony terminal and plurality of electronic devices, when a call is received, recognizing reception of the call and transmitting an event, which notifies of reception of the call, to the telephony control point by the telephony terminal; and
 receiving the event, which notifies of the reception of the call, by the telephony control point.

21. The method of claim 19, wherein the media capability information requested to the telephony terminal by the telephony control point includes transfer information indicating a multi-call transfer scheme.

22. The method of claim 21, wherein the multi-call transfer scheme comprises an integration transfer scheme for integrating multiple pieces of call data into multi-call data and then transferring the multi-call data and a session transfer scheme for configuring a session for the multi-call data and then transferring the multi-call data according to the configured session.

23. The method of claim 19, wherein configuring the multi-call connection comprises:
 identifying the transfer information and transferring a configuration message for configuring such that the multi-call data is transferred according to a multi-call transfer scheme supportable by the telephony terminal, to the telephony server by the telephony control point; and
 receiving the configuration message and configuring the multi-call connection according to the multi-call transfer scheme included in the received configuration message by the telephony terminal.

24. The method of claim 22, wherein performing the multi-call control comprises:
 integrating multi-call data by the telephony terminal when the multi-call transfer scheme is the integration transfer scheme; and
 controlling to transfer the integrated multi-call data to the first electronic device and the second electronic device.

25. The method of claim 22, wherein performing the multi-call control comprises:
 configuring multiple sessions for call transfer when the multi-call transfer scheme is the session transfer scheme; and
 transferring the multi-call data through the configured multiple sessions, respectively.

26. A telephony terminal, comprising:
 a receiver which receives a request for media capability information indicating supportable media information from a telephony control point;
 a transmitter which transmits the requested media capability information to the telephony control point; and
 a telephony server which configures a first multi-call connection of a first electronic device in a first network and a second multi-call connection of a second electronic device in the first network, and performs multi-calls of the first electronic device and the second electronic device, the first and second multi-call connections being configured with reference to the selected media capability information, wherein the telephony terminal, the first electronic device and the second electronic device are included in a first network corresponding to the telephony control point.

27. The telephony terminal of claim 26, wherein the telephony server further recognizes reception of a call, before the request for the media capability information is received, when receiving the call, and controls the transmitter to transmit an event, which notifies of reception of the call, to the telephony control point.

28. The telephony terminal of claim 26, wherein the transmitter further transmits the media capability information including transfer information indicating a supportable multi-call transfer scheme to the telephony control point.

29. The telephony terminal of claim 28, wherein the multi-call transfer scheme comprises an integration transfer scheme for integrating multiple pieces of call data into multi-call data, transferring the multi-call data and a session transfer scheme for configuring a session for the multi-call data, and transferring the multi-call data according to the configured session.

30. The telephony terminal of claim 29, wherein the telephony server further receives a configuration message for configuring such that the multi-call data is transferred from the telephony control point according to a multi-call transfer scheme, and configures the multi-call connection according to the multi-call transfer scheme included in the received configuration message.

31. The telephony terminal of claim 29, wherein the telephony server further integrates the multi-call data when the multi-call transfer scheme is the integration transfer scheme, and transfers the integrated multi-call data to the first electronic device and the second electronic device.

32. The telephony terminal of claim 29, wherein the telephony server further configures a session for call transfer with the telephony terminal when the multi-call transfer scheme is the session transfer scheme, and receives call data through the configured session.

33. A first electronic device in a first network, comprising:
a receiver which receives a request for media capability information indicating supportable media information from a telephony control point;
a transmitter which transmits the requested media capability information to the telephony control point, and connects a first media session with the telephony terminal; and
a controller which controls the first electronic device in the first network together with the connection-configured telephony terminal,
wherein the telephony terminal and the first electronic device are included in the first network corresponding to the telephony control point.

34. The first electronic device of claim 33, wherein the controller further transmits an event, which notifies of reception of a call, to the telephony control point, before the request for the media capability information is received, when receiving the call.

35. The first electronic device of claim 33, wherein the controller further starts to transmit and receive a media stream when a message for starting of the media session has been received from the telephony control point, and transmits media session information indicating a media session state to the telephony control point.

36. The first electronic device of claim 33, wherein the controller further controls one or more combinations of starting of media transmission to the connection-configured telephony server, media session change, and media transmission termination.

37. A telephony multi-call service system being controlled by a device including a processor, comprising:
a telephony terminal and a plurality of telephony clients in a first network for transmitting media capability information indicating supportable media information to a telephony control point in response to a request, the telephony terminal and the plurality of telephony clients in the first network being connection-configured and controlled by the telephony control point; and
the telephony control point for requesting the media capability information to the telephony terminal and the plurality of telephony clients including a first electronic device and a second electronic device in the first network, receiving the requested media capability information and selecting media capability information used for multi-call service from the received media capability information, configuring a first multi-call connection of the telephony terminal and the first electronic device, and a second multi-call connection of the terminal and the second electronic device, the first and second multi-call connections being configured with reference to the selected media capability information, and performing multi-call control for the multi-call connection-configured telephony terminal and the plurality of electronic devices,
wherein the telephony terminal and the plurality of telephony clients are included in the first network corresponding to the telephony control point.

38. The system of claim 37, wherein the telephony terminal recognizes reception of a call and transmits an event, which notifies of reception of the call, to the telephony control point, before the telephony control point transmits the request for the media capability information to the telephony terminal and the plurality of electronic devices, when the call has been received; and
the telephony control point receives the event, which notifies of reception of the call.

39. The system of claim 37, wherein the telephony control point requests the media capability information including transfer information indicating a multi-call transfer scheme to the telephony terminal.

40. The system of claim 39, wherein the multi-call transfer scheme comprises an integration transfer scheme for integrating multiple pieces of call data into multi-call data and then transferring the multi-call data and a session transfer scheme for configuring a session for the multi-call data and then transferring the multi-call data according to the configured session.

41. The system of claim 40, wherein the telephony control point identifies the transfer information and transfers a configuration message for configuring such that multi-call data is transferred according to a multi-call transfer scheme supportable by the telephony terminal, to the telephony terminal; and
the telephony terminal receives the configuration message and configures the multi-call connection according to the multi-call transfer scheme included in the received configuration message.

42. The system of claim 40, wherein when the multi-call transfer scheme is the integration transfer scheme, the telephony control point controls the telephony terminal to integrate multi-call data and transfer the integrated multi-call data to the first electronic device and the second electronic device.

43. The system of claim 40, wherein when the multi-call transfer scheme is the session transfer scheme, and the telephony control point controls the telephony terminal to configure multiple sessions for call transfer and transfer the multi-call data through the configured multiple sessions, respectively.

\* \* \* \* \*